United States Patent
Scheinberg et al.

[11] Patent Number: 5,295,835
[45] Date of Patent: Mar. 22, 1994

[54] TRAINING MANIKIN FOR CARDIO-PULMONARY RESUSCITATION HAVING NESTED INFANT-SIZE MANIKIN

[75] Inventors: Samuel Scheinberg, Lincoln City, Oreg.; David E. Moeller, Bainbridge Island, Wash.

[73] Assignee: The Seaberg Company, Inc., South Beach, Oreg.

[21] Appl. No.: 929,331

[22] Filed: Aug. 12, 1992

[51] Int. Cl.$^5$ ............................................. G09B 23/28
[52] U.S. Cl. ............................................. 434/265
[58] Field of Search ..................... 434/265, 262, 267

[56] References Cited

U.S. PATENT DOCUMENTS

| | | |
|---|---|---|
| 3,049,811 | 8/1962 | Ruben . |
| 3,068,590 | 12/1962 | Padellford . |
| 3,199,225 | 8/1965 | Robertson et al. . |
| 3,209,469 | 10/1965 | James . |
| 3,276,147 | 10/1966 | Padellford . |
| 3,520,071 | 7/1970 | Abrahamson et al. . |
| 3,562,924 | 2/1971 | Baerman et al. . |
| 3,736,362 | 5/1973 | Laerdal . |
| 3,859,737 | 1/1975 | Laerdal . |
| 3,916,535 | 11/1975 | Hewson . |
| 3,994,075 | 11/1976 | Kohnke . |
| 4,001,950 | 1/1977 | Blumenssaadt . |
| 4,194,303 | 3/1980 | Heller ............................ 434/267 |
| 4,331,426 | 5/1982 | Sweeney ....................... 434/265 |
| 4,484,896 | 11/1984 | Kohnke ......................... 434/265 |
| 4,611,998 | 9/1986 | Ramamurthy ................ 434/265 |
| 4,797,104 | 1/1989 | Laerdal et al. ................ 434/265 |
| 4,801,268 | 1/1989 | Kohnke ......................... 434/265 |
| 4,850,876 | 7/1989 | Lutaenko et al. ............. 434/265 |
| 4,984,987 | 1/1991 | Brault et al. .................. 434/265 |
| 5,055,052 | 10/1991 | Johnsen ........................ 434/265 |

*Primary Examiner*—Gene Mancene
*Assistant Examiner*—Jeffrey A. Smith
*Attorney, Agent, or Firm*—Chernoff, Vilhauer, McClung & Stenzel

[57] ABSTRACT

A training manikin for use in teaching students to perform cardio-pulmonary resuscitation includes a head, a neck, and a torso molded integrally of a resilient material allowing flexure of the neck and providing realistic resistance to compression of the torso in simulating external heart massage. A tubular airway passage includes a restrictor and can receive obstructors. A cavity in the torso holds a smaller, infant-size similar manikin. The manikin may have a tough watertight skin surrounding a core of resilient microporous foam of lesser density.

12 Claims, 4 Drawing Sheets

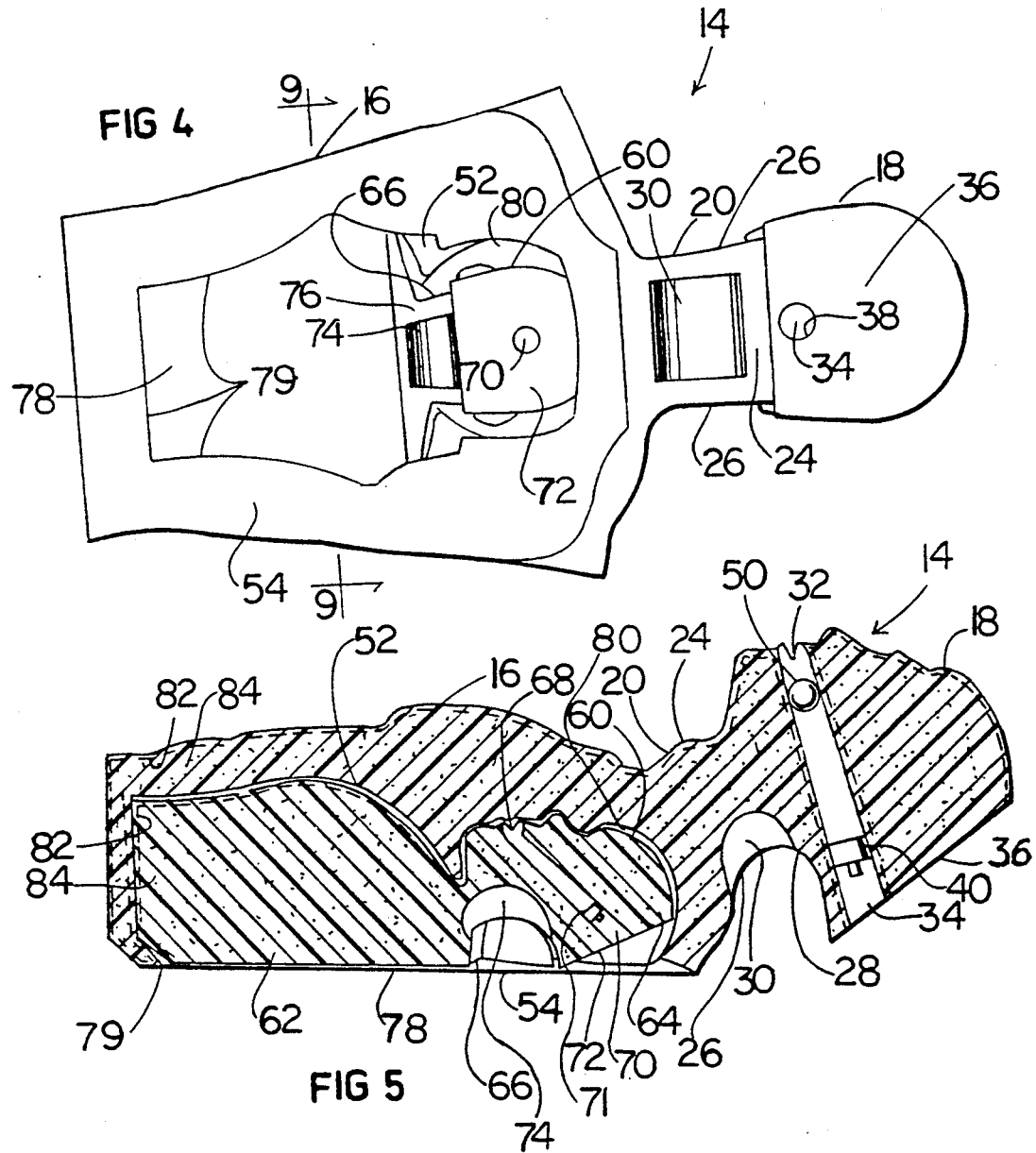

TRAINING MANIKIN FOR CARDIO-PULMONARY RESUSCITATION HAVING NESTED INFANT-SIZE MANIKIN

BACKGROUND OF THE INVENTION

The present invention relates to training individuals to perform cardio-pulmonary resuscitation and relates particularly to a manikin useful in providing such training.

Manikins have been used for years for training individuals to perform mouth-to-mouth artificial respiration and closed chest heart massage, known as cardiopulmonary resuscitation, or CPR, and for instruction in rescue breathing where heart failure is not a factor. In the past such manikins have been built in several pieces often including hollow shells of somewhat flexible and resilient materials, with various tubes, bellows, air bladders, valves, and pressure sensors housed within the shells. Articulation of head and neck portions has been accomplished through use of various swivel or hinge joints interconnecting separate parts. Such complexity of manikins provides some realism in the simulation of performing rescue breathing and CPR using such manikins, but adds considerably to the initial cost and to the cost of maintaining such manikins.

The complexity of such previously available manikins thus makes such manikins undesirably expensive, and creates an undesirable limitation on the availability of CPR training.

While the sensible feedback provided by complex CPR and rescue breathing training manikins available in the past may be instructive and reassuring, it is not essential to providing useful and valuable training in CPR. What is essential is merely that an opportunity be available to practice mouth-to-mouth breathing techniques and chest compression methods, without danger of injury or disease. While Kohnke U.S. Pat. No. 4,801,268 discloses a manikin capable of such function, it, too, is more complex than is necessary.

A common reason for performing rescue breathing and CPR is the so-called "cafe coronary" where a person chokes on a piece of food, and so it is desirable to teach techniques, such as the Heimlich maneuver, for clearing a person's airway to permit breathing. It is therefore desirable for a CPR training manikin to be useful for instruction in proper use of the Heimlich maneuver.

What is needed, then, is a CPR training manikin, on which mouth-to-mouth rescue breathing and closed chest heart massage can be practiced, which is inexpensive, durable, easily cleaned, and low in requirements for maintenance and repairs.

SUMMARY OF THE INVENTION

The present invention provides a CPR training manikin which is easily manufactured, cleaned, and maintained, and which is of simple unitary structure, yet which affords the opportunity for a trainee to practice mouth-to-mouth rescue breathing and external heart massage. The CPR training manikin according to the present invention is primarily a unitary structure of molded foam plastic material in the shape of a human torso, neck, and head. A mouth communicates with a tubular airway through which a trainee can practice mouth-to-mouth rescue breathing.

In a preferred embodiment of the invention a restrictor is provided in the tubular airway to provide resistance to simulate internal pressure opposing breathing into a victim in performing rescue breathing.

Preferably, the neck portion of the manikin according to the invention is of a design permitting elastic flexure with application of a reasonable amount of force, simulating the effort needed to flex the neck of a living person.

In a preferred embodiment of the invention the manikin is molded of micro-cellular foam plastic such as urethane, with a tough, waterproof skin portion formed in contact with the surfaces of a mold, and a core portion of lesser density contained within the skin, providing for compressibility of the torso portion of the manikin.

A preferred embodiment of the invention includes an adult-size manikin defining a cavity within its torso portion, with a second manikin representing the torso and head of an infant fitting removably within the cavity, to be removed when desired to train students in performing CPR on infants.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 4 is a bottom plan view of the manikin shown in FIG. 1.

FIG. 5 is a sectional view of the manikin shown in FIG. 1, taken along line 5—5.

DETAILED DESCRIPTION OF A PREFERRED EMBODIMENT

Figure 1:
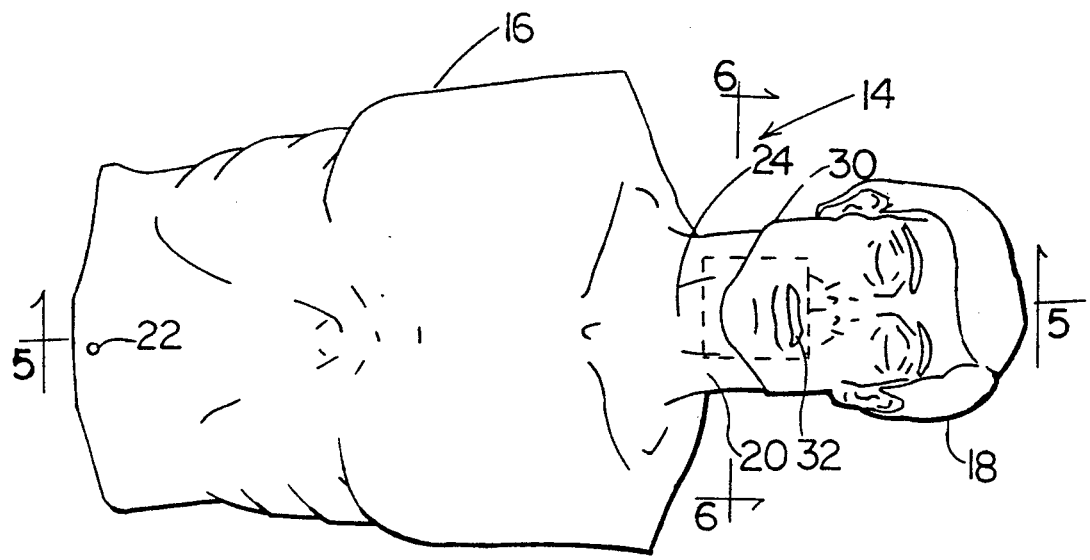
FIG. 1 is a top view of a cardio-pulmonary resuscitation training manikin embodying the present invention in a normal position simulating a victim needing rescue breathing or cardio-pulmonary resuscitation.

Referring now to the drawings which form a part of the disclosure herein, a training manikin 14 shown in FIGS. 1-4 includes a torso portion 16, a head portion 18, and a neck portion 20 interconnecting the head 18 with the torso 16. The torso portion 16 is preferably a representation of the shape of an adult human torso, lifelike in shape, and extending upwards from just below the location of the navel 22, but omitting the arms. The torso 16, because it extends down to the navel 22, is useful in teaching the Heimlich maneuver used for pneumatically clearing an obstruction from a person's airway.

Figure 2:
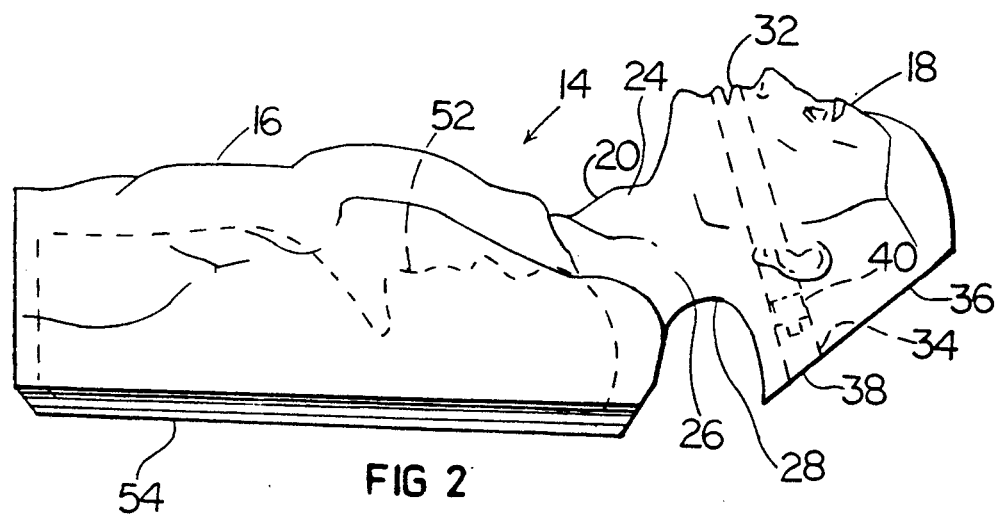
FIG. 2 is a side elevational view of the manikin shown in FIG. 1.
Figure 3:
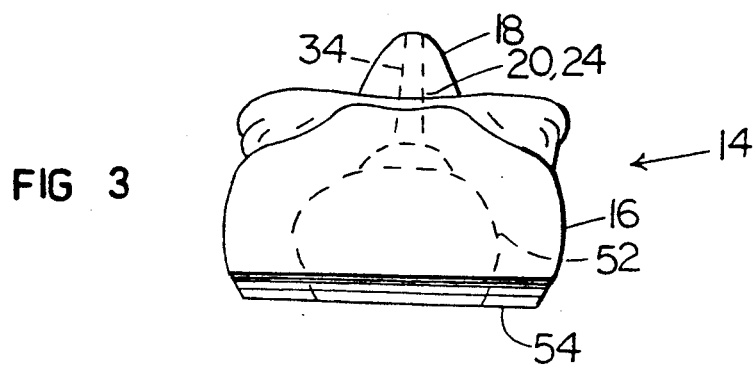
FIG. 3 is an end elevational view of the manikin shown in FIG. 1.
Figure 6:
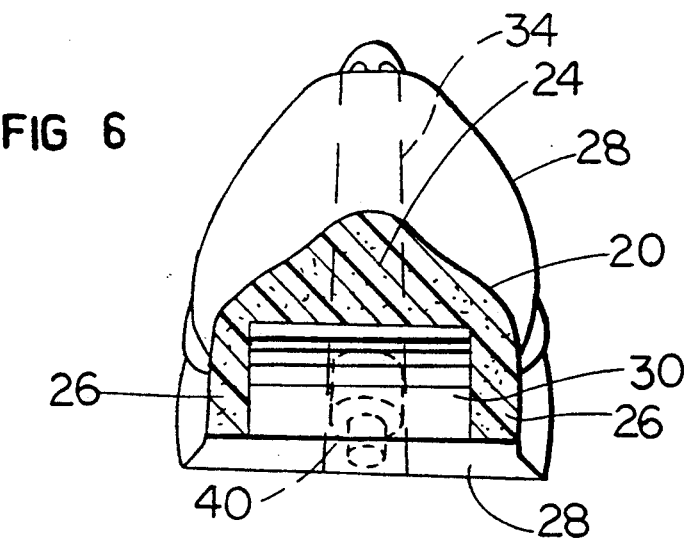
FIG. 6 is a sectional view of the manikin shown in FIG. 1, taken along the line 6—6.
Figure 7:
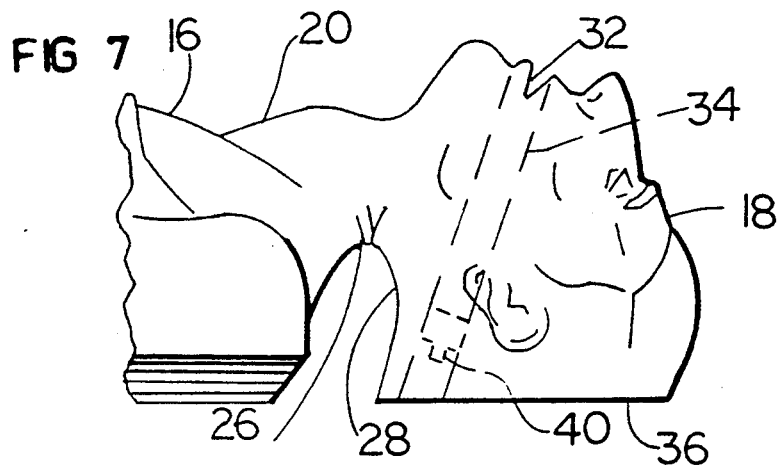
FIG. 7 is a detail view of a portion of the manikin shown in FIG. 2, with the head of the manikin tilted back to simulate opening a victim's airway.
Figure 8:
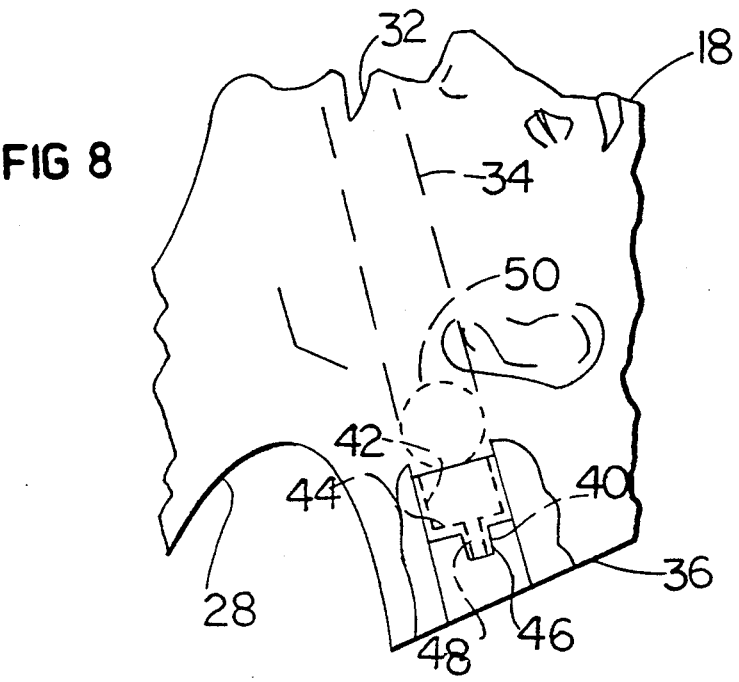
FIG. 8 is a detail view, at an enlarged scale, showing part of the head portion of the manikin shown in FIG. 1, including an airway restrictor.

The neck portion 20 is generally lifelike in shape in its front portion 24 and the two opposite lateral portions 26 extending rearwardly on each side from the front portion 24, as may be seen in FIGS. 1 and 2, but the back side 28 of the neck is not lifelike in shape. Instead, the back side 28 is generally concave, as may be seen best in FIG. 2, and defines a semicylindrical cavity 30 best seen in FIGS. 4, 5, and 6. As may be seen best in FIG. 6, the lateral portions 26 and the front portion 24 provide a structure in the general form of an inverted "U" shape, allowing the neck to flex so that the head can be tilted rearwardly, elevating the chin, to the position shown in FIG. 7.

The head portion 18 includes a mouth 32 defining an opening which communicates with a tubular airway 34 extending rearwardly from the mouth 32 toward a generally planar back side 36 of the head. The back side 36 is inclined forward relative to the head portion 18, that is, from the location of an imaginary vertical plane which would pass through the head of a standing person. This provides an additional benefit of reinforcing instruction in elevating a victim's jaw and tilting the head rearward to provide an open airway, since when the head 18 is in the proper position the back side 36 is parallel or coplanar with the back side 54 of the torso 16. An airway opening 38, which is the opposite end of the airway 34 communicating with the mouth 32, is located on the inclined back side 36 as shown in FIG. 4.

Located within the tubular airway 34 is a restrictor 40, which is preferably held in place by friction. The restrictor 40 includes a generally cylindrical wall 42, a base 44, and a neck 46. The neck 46 and base 44 define an orifice 48 whose size, for example a diameter of about 0.187 inch, provides a restriction of the flow of air through the airway 34 to simulate the normal resistance to forcing air into a person during cardiopulmonary resuscitation. The wall 42 and base 44 of the restrictor 40 together define a cup-like receptacle facing toward the mouth 32, and an obstructor ball 50 may be inserted into the airway 34 through the mouth 32 to simulate blockage of a victim's airway. Such an obstructor ball 50 can be removed practically from the tubular airway, but if not removed would lodge in the cup-like receptacle defined by the wall 42 and base 44 of the restrictor 40. An obstructor ball 50 may be of resilient foam plastic material, of a size which fits snugly in the airway 34 but may easily be placed into the airway through the mouth 32.

Figure 9:
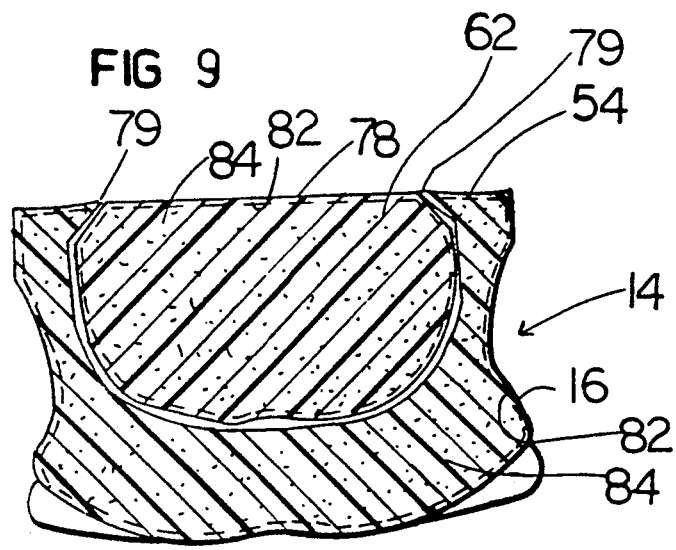
FIG. 9 is a sectional view of the manikin shown in FIG. 4, taken along line 9—9 thereof.
Figure 10:
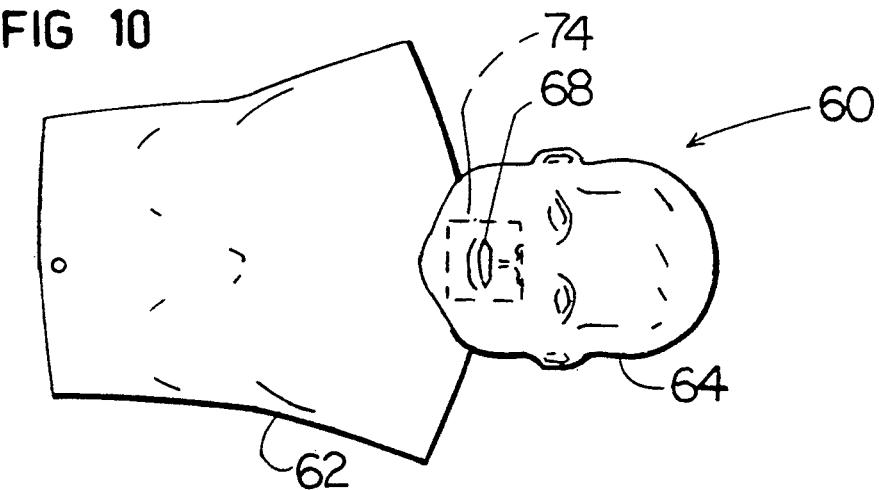
FIG. 10 is a top plan view of the infant-size manikin shown in FIG. 4.
Figure 11:
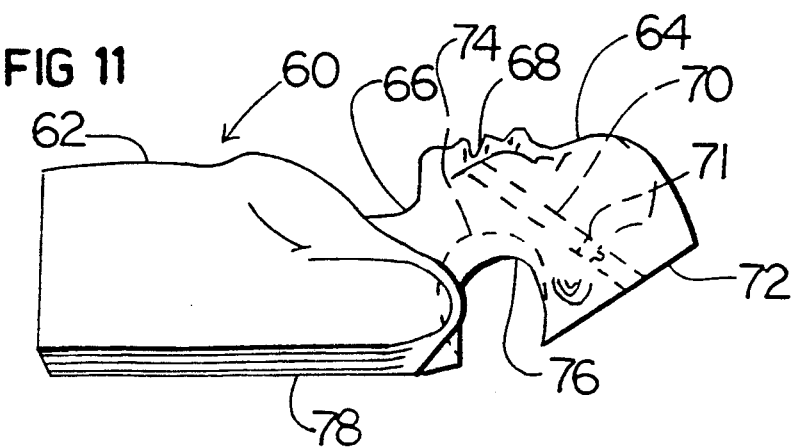
FIG. 11 is a side elevational view of the infant-size manikin shown in FIG. 10.

The torso portion 16 of the manikin 14 includes a body cavity 52 shown in FIGS. 2, 4, and 9. The body cavity 52 is open toward a back side 54 of the torso portion 16, as shown in FIG. 4. An infant-size training manikin 60 is removably located within the body cavity 52 so that both the adult-size manikin 14 and the infant-size manikin can be transported and stored in a space no greater than needed for the adult-size manikin alone.

The infant-size manikin 60 includes a torso portion 62 which is significantly smaller than the torso portion 16, and which fits snugly within the body cavity 52, whose shape corresponds closely to that of the torso portion 62 of the infant-size manikin. The infant-size manikin 60 also includes a head portion 64 connected with the torso portion 62 by a neck portion 66. The head portion 64 is similar to the head portion 18, except for its smaller size, but is preferably shaped to have the appearance of the head of an infant. The head portion 64 includes a mouth 68 which is open and communicates with a tubular airway 70 extending rearwardly within the head portion 64 from the mouth 68 and similar to the tubular airway 34 of the manikin 14, except that the mouth 68 and tubular airway 70 are smaller in the infant-size manikin 60. A restrictor 71, similar to but smaller than the restrictor 40, is located in the airway 70 to perform the same function as the restrictor 40 in the manikin 14. Because of the smaller size of an infant the orifice is preferably about 0.145 inch in diameter. A back side 72 of the head portion 64 is inclined forward in the same manner as the back side 36 of the head 18 of the manikin 14.

The neck portion 66 of the infant-size manikin 60 is also similar to the neck portion 20 of the manikin 14, and includes a cavity 74 defined in the back side 76 of the neck portion 66, so that the neck portion 66, like the neck portion 20, has a U-shaped cross section making the neck portion 66 readily flexible to tilt the head portion 64 with respect to the torso portion 62.

The torso portion 62 preferably includes a generally planar back side 78 which extends generally coplanar with the back side 54 of the torso portion 16 of the manikin 14 when the infant-size manikin 60 is held within the body cavity 52. Portions of the back side 54 of the torso 16 of the manikin 14 defining the opening to the body cavity 52 include peripheral edges 79 which wrap partially around the torso portion 62 of the infant-size manikin 60 holding the infant-size manikin 60 snugly within the body cavity 52. The body cavity 52 provides slightly more space, as at 80, around the head portion 64, however, so that the head portion 64 may be grasped to pull the infant-size manikin from the body cavity 52 for use.

The training manikin 14 and the infant-size manikin 60 are of similar construction, preferably of molded micro-cellular urethane foam which when molded forms a tough, watertight, non-porous skin 82 adjacent the mold surfaces, while a porous micro-cellular foam core 84 of lesser density is formed within portions of the manikin 14 or 16 which are spaced somewhat apart from the mold cavity surfaces. Formation of the skin 82 may be enhanced, if desired, by spraying the interior surfaces of the mold cavity with a suitable urethane composition prior to filling the remainder of the mold cavity with a self-blowing urethane foam composition.

While other compositions may be found which would work equally well, one preferred composition which has been found to perform well is a water blown polyester based polyol system of polymeric material producing an integrally skinned microcellular polyurethane foam structure. Such material is available from Cook Composites & Chemicals of Port Washington, Wis., under Stock No. 030-2524/030-2067. This is a two-part system including a polyester based polyol part and an isocyanate part. Such material, when molded according to the manufacturer's instructions, produces a skin layer 82 which is smooth and easily cleaned and suitably thick to resist damage during use of a cardio-pulmonary resuscitation training manikin such as the manikins 14 and 60 without rupture of the skin 82. Such a skin optimally has a hardness of about Shore 30A. At the same time, the micro-cellular foam core 84 is resilient, yet adequately resistant to pressure to closely simulate the flexibility and limited compressibility of a human torso during administration of cardio-pulmonary resuscitation efforts. The microcellular foam density may be in the range of 1 to 10 pounds per cubic foot, and is preferably about 3.5 lb/ft³ in density to provide the correct amount of resiliency.

The training manikin 14 can be used either with or without removal of the infant-size manikin 60 from the body cavity 52. Greater flexibility of the chest, to simulate a smaller person, is provided when the infant-size manikin 60 is removed, and greater resistance to chest pressure, as with a heavier-framed person, is simulated by leaving the infant-size manikin 60 in the body cavity 52 during compression by a CPR trainee. The infant-size manikin 60 may be used once removed from the body cavity 52, to provide training for application of CPR to an infant.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A unitary cardio-pulmonary resuscitation training manikin, comprising:
   (a) a head portion defining a mouth opening and a tubular airway extending from said mouth rearwardly through said head portion;
   (b) a torso portion; and
   (c) a neck portion interconnecting said head and torso portions, said head, torso, and neck portions being an integral structure of micro-cellular foam, and said neck being flexible, allowing said head portion to be tilted between a normal position and a rearwardly tilted position by elastic flexure of said neck portion, and said head, neck, and torso portions being of a first, larger size and said torso portion defining a rearwardly open body cavity, and said manikin further comprising a smaller, infant-size manikin contained within said body cavity.

2. The training manikin of claim 1 wherein said head portion has a back side defining an airway opening and said tubular airway extends entirely through said head portion to said airway opening.

3. The training manikin of claim 2, further including an obstructing ball of resilient foam material removably placed in said tubular airway and held in said tubular airway in a compressed configuration to simulate an obstructed airway in a human.

4. The training manikin of claim 1 wherein said neck portion has a back side and a pair of opposite lateral portions and defines a cavity in said back side, between said lateral portions, said cavity enhancing flexibility of said neck portion.

5. The training manikin of claim 1 wherein said infant-size manikin includes a head portion having a mouth and a back side and defining a tubular airway extending through said head portion from said mouth toward said back side.

6. The training manikin of claim 1 wherein said torso portion has a back side and wherein said infant-size manikin includes a smaller torso portion having a generally planar back side and wherein said body cavity is shaped to conform to the shape of said infant-size manikin to receive said smaller torso portion of said infant-size manikin snugly within said body cavity and to hold said infant-size manikin with the back side thereof located generally coplanar with said back side of said torso portion of said first, larger size.

7. The training manikin of claim 1 wherein said infant-size manikin includes a torso portion of molded resilient polymeric foam material having a tough substantially watertight skin surrounding a core portion of lesser density.

8. The training manikin or claim 1 wherein said head portion, torso portion, and neck portion are integrally molded of resilient polymeric material having a tough substantially watertight skin layer surrounding a core portion of lesser density.

9. The training manikin of claim 1 wherein said neck portion has a front, a pair of opposite lateral portions, and a back side and defines a cavity open toward said back side, said front and lateral portions defining a generally U-shape facilitating flexure of said neck portion.

10. The training manikin of claim 1, said head portion having a forwardly inclined generally planar back side.

11. The training manikin of claim 10, said torso portion including a back side and said forwardly inclined back side of said head being oriented parallel with said back side of said torso portion when said head is properly located for rescue breathing.

12. The training manikin of claim 1, including a restrictor device located within said tubular airway.

* * * * *

UNITED STATES PATENT AND TRADEMARK OFFICE
CERTIFICATE OF CORRECTION

PATENT NO. :   5,295,835
DATED      :   March 22, 1994
INVENTOR(S):   Samuel Scheinberg et al.

It is certified that error appears in the above-identified patent and that said Letters Patent is hereby corrected as shown below:

In the Drawings :
In FIG. 4 change the reference numeral "24" at the upper right side of the figure to read --28--.

Signed and Sealed this

Thirteenth Day of June, 1995

Attest:

BRUCE LEHMAN

Attesting Officer

Commissioner of Patents and Trademarks